US009803790B2

(12) United States Patent
Pestunov

(10) Patent No.: US 9,803,790 B2
(45) Date of Patent: Oct. 31, 2017

(54) SELF-KILLING OF SHOCK PULSES OF TRANSFERRED MEDIUM IN MAIN PIPELINE

(71) Applicant: Obschestvo s ogranichennoi otvetstvennostju "TekhPromArma", Moscow (RU)

(72) Inventor: Vitaly Alfredovich Pestunov, Moscow (RU)

(*) Notice: Subject to any disclaimer, the term of this patent is extended or adjusted under 35 U.S.C. 154(b) by 0 days.

(21) Appl. No.: 14/406,673

(22) PCT Filed: Sep. 30, 2013

(86) PCT No.: PCT/RU2013/000858
§ 371 (c)(1),
(2) Date: Dec. 9, 2014

(87) PCT Pub. No.: WO2015/016738
PCT Pub. Date: Feb. 5, 2015

(65) Prior Publication Data
US 2016/0223118 A1 Aug. 4, 2016

(30) Foreign Application Priority Data
Jul. 31, 2013 (RU) .............................. 2013135696

(51) Int. Cl.
*F16L 55/04* (2006.01)
*F16L 55/045* (2006.01)
*F17D 1/20* (2006.01)

(52) U.S. Cl.
CPC .............. *F16L 55/045* (2013.01); *F17D 1/20* (2013.01); *F15B 2201/205* (2013.01)

(58) Field of Classification Search
CPC .............................................. Y10T 137/0396
(Continued)

(56) References Cited

U.S. PATENT DOCUMENTS 2,678,066 A * 5/1954 Coolidge ............. G05D 7/0133
138/45
3,744,527 A * 7/1973 Mercier .................... F15B 1/16
138/30
(Continued)

*Primary Examiner* — R. K. Arundale
(74) *Attorney, Agent, or Firm* — Vera Chernobylsky; Law Offices of Vera Chernobylsky

(57) ABSTRACT

The invention relates to the field of physics—namely, to control systems and the pressure control of liquids and gases, in particular—to stabilizing devices operating at overloads, including hydraulic shocks. Technical result from use of the claimed invention is simplicity of the manufacturing process and assembly, easiness of operation and efficiency of quenching pulses. A method consists of the fact that at the section of said pipeline installed at least one pressure pulse stabilizer in the direction of movement of transferred medium from supplier to consumer. Pulse flow is directed as a first portion into the stabilizer, and after its first portion a second portion of the flow is directed, which after a delay is sent into additional input of the stabilizer. The potential sources of pressure pulses are preliminary revealed on the protected section of the pipeline. Then the place of installation of the stabilizer is defined based on condition—at a distance no further than 10 meters from the potential point source of pressure pulses and on condition—at a distance 100-1000 meters during preventive installation on the road, at least two stabilizers on the stage. Stabilizers are oriented on the pointer on its outer surface toward the potential point source of the pressure pulses and the arrows pointed in the same direction as the direction of flow of the transferred medium at the stages. Stabilizers have straight flow chamber for at least ⅓ less than largest vortex chamber, between the casing and shell—pressurized chamber connected via radial openings with straight flow chamber and the equalizing chamber, which connected via inclined holes with the vortex chamber. The diameter of the radial openings is 1.2-4 of the diameter of inclined holes. The angles α and
(Continued)

β of inclined holes—in the range 0-45°. Pressure in the pressure and in the levering chambers is equalized by shifting the pistons by the springs to the original position. Different options are offered for killing of pressure pulse by different means, associated with variations in the design of elements of the stabilizer.

4 Claims, 4 Drawing Sheets

(58) Field of Classification Search
USPC .................................................. 138/30, 31
See application file for complete search history.

(56) References Cited

U.S. PATENT DOCUMENTS

| | | | | |
|---|---|---|---|---|
| 4,497,388 A * | 2/1985 | Dexter | ................... | F16L 55/053 |
| | | | | 138/30 |
| 4,759,387 A * | 7/1988 | Arendt | ..................... | F15B 1/16 |
| | | | | 138/30 |
| 5,735,313 A * | 4/1998 | Jenski, Jr. | ............ | F04B 11/0016 |
| | | | | 138/26 |
| 5,740,837 A * | 4/1998 | Chiang | ............... | G05D 16/0602 |
| | | | | 138/31 |
| 5,860,452 A * | 1/1999 | Ellis | ...................... | F16L 55/054 |
| | | | | 138/26 |
| 6,264,069 B1 * | 7/2001 | Hughes | ................... | B67D 1/08 |
| | | | | 138/30 |

* cited by examiner

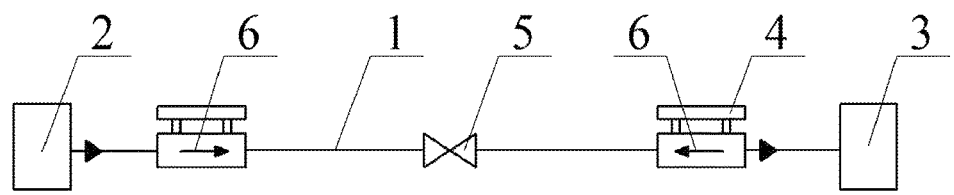
FIG. 1
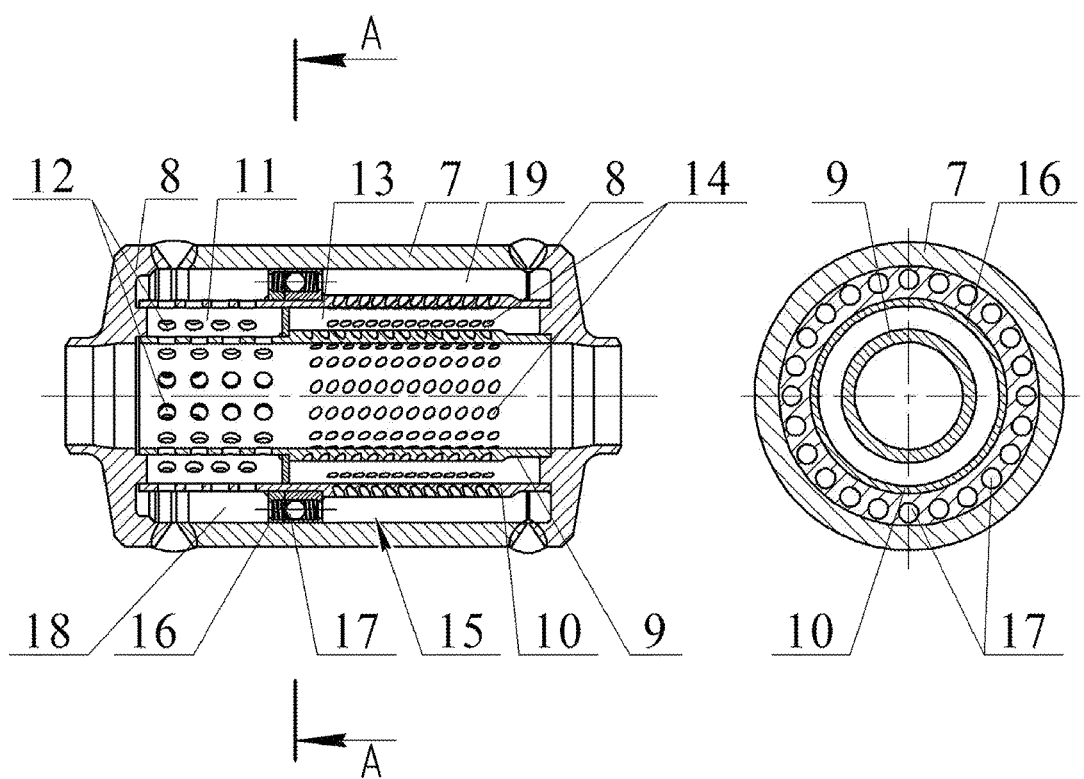
FIG. 2                    FIG. 3

SELF-KILLING OF SHOCK PULSES OF TRANSFERRED MEDIUM IN MAIN PIPELINE

BACKGROUND OF THE INVENTION

Field of the Invention

The invention relates to the field of physics—namely, to control systems and the pressure control of liquids and gases, in particular—to stabilizing devices operating at overloads, including hydraulic shocks.

Description of the Related Art

Short circuit and power supply failures, commutation switching, attendants' errors, etc. events can lead to accidents, leaky pipelines, failure of equipment and fittings. According to the operating experience causes of rupture of pipelines in 60% of cases are hydro-shocks, pressure drops and vibration, about 25% comes from corrosion processes, 15%—from natural phenomena and force majeure circumstances. According to Russian and foreign experts, the biggest breaks of piping systems with the most serious consequences are caused by hydro-shocks.

Economic losses associated with the aftermath of the accidents in a modern city, consist of the direct costs of replacing the emergency section of the pipeline and infrastructure rehabilitation (average of from 1 to 10 million Rubles), the loss of the transferred medium (up to 30% in real terms), indirect costs (preparation, purification and transport of water), as well as the cost of dealing with the environmental and social aftermath.

Known method of self-extinguishing of shock pulses of transferred medium in main pipelines, consists in the fact that at the section of said pipeline installed pressure pulse stabilizer in the direction of movement of transferred medium from supplier to consumer, then pulse flow is directed as a first portion into the stabilizer, and after its first portion a second portion of the flow is directed, which after a delay is sent into additional input of the stabilizer (published application RU2011101629, publication date Jul. 27, 2012g.).

This technical solution is the closest to the invention, therefore, taken as a prototype.

The disadvantages of the prototype are the complexity of the manufacturing process, assembly and repair, low efficiency of quenching pulses.

SUMMARY OF INVENTION

Technical result from use of the claimed invention is simplicity of the manufacturing process and assembly, easiness of operation and efficiency of quenching pulses.

Below are the general and specific essential features characterizing causation of this invention with the specified technical result.

A method of self-extinguishing of shock pulses of transferred medium in main pipelines, consists of the fact that at the section of said pipeline installed at least one pressure pulse stabilizer in the direction of movement of transferred medium from supplier to consumer. Then pulse flow is directed as a first portion into the stabilizer, and after its first portion a second portion of the flow is directed, which after a delay is sent into additional input of the stabilizer. The potential sources of pressure pulses are preliminary revealed on the protected section of the pipeline. Then the place of installation of the stabilizer is defined based on condition— at a distance no further than 10 meters from the potential point source of pressure pulses and on condition—at a distance 100-1000 meters during preventive installation on the road, at least two stabilizers on the stage. Stabilizers are oriented on the pointer on its outer surface toward the potential point source of the pressure pulses and the arrows pointed in the same direction as the direction of flow of the transferred medium at the stages. Energy of the perturbing pulse pressure in the main pipelines is killed by the phase shift and suppression of wave, and oscillations and resonance processes in transferred medium by performing a stabilizer of a hollow cylindrical casing with covers at its ends and concentrically secured detachable separator and separation shell to make the inner chamber therebetween separated by separating web into two unequal parts: straight flow chamber smaller in size—at inlet of the stabilizer, into which through the radial holes entering the first part of the flow of the transferred medium and a vortex chamber larger in size in which the specified delay performed by diverting of the second part of the flow through the said additional inlet in the form of inclined holes, and—to form a compensation chamber between the shell and casing, separated by a damping block with a spring-loaded piston into a pressure chamber connected with the radial holes with the straight flow chamber and the equalizing chamber connected by the inclined holes with the vortex chamber. Volume of the straight flow chamber is set not less than $\frac{1}{3}$ of the total volume of the vortex chamber; the diameter of the radial holes is 1.2-4 of the diameter of the inclined holes at equal total expenditures of the working medium through the radial and inclined holes. Angles of all inclined holes are set as: a relative to the radial axis of the cross section and $\beta$—relative to the longitudinal axis in the range of 0-45°, then pressure is equalized in the pressure and leveling chambers to be equal to the pressure in the pipeline by shifting the pistons of the damping block by the springs to the original position and then performed free flow of the transferred medium through the stabilizer. Said killing of pressure pulse is accomplished through the damping block, which is in the form of a ring holder with axial holes with said spring-loaded on both sides pistons; wherein a ring holder is divided by the plane of its transverse axis into two parts of unequal thickness, the smaller of which is directed to the straight flow chamber and is permanently secured to the divider, and the largest is connected with the protrusion on the last. Said killing of pressure impulse is performed by a series of separated from the casing, connected thereto extension pipes, with axes parallel to the axis of separator, and end plugs of cylindrical damping chambers, which are separated by the perforated webs into three volumes, in the central of which between the elastic elements situated said piston. Said killing of pressure pulse is accomplished by damping block, which is in the form ring holder with axial holes, wherein a ring holder is divided by the plane of its transverse axis into two parts of unequal thickness, the smaller of which is directed to the straight flow chamber and is permanently secured to the divider, and the largest is connected with the protrusion on the last, wherein casing is performed collapsible of spacer integrally connected to the output, input and internal flanges, wherein the meter is set at the outlet intermediate flange, and cylindrical walls of the flow separator and the separation shell are performed with thickenings, in which said inclined holes are evenly spread.

BRIEF DESCRIPTION OF THE DRAWINGS

Summary of the invention illustrated by drawings:

FIG. 1 shows a diagram of the installation of stabilizers;

FIG. 2—longitudinal section of stabilizer;

FIG. 3 shows view A-A of the FIG. 2;

DESCRIPTION OF THE PREFERRED EMBODIMENT

Figure 4:
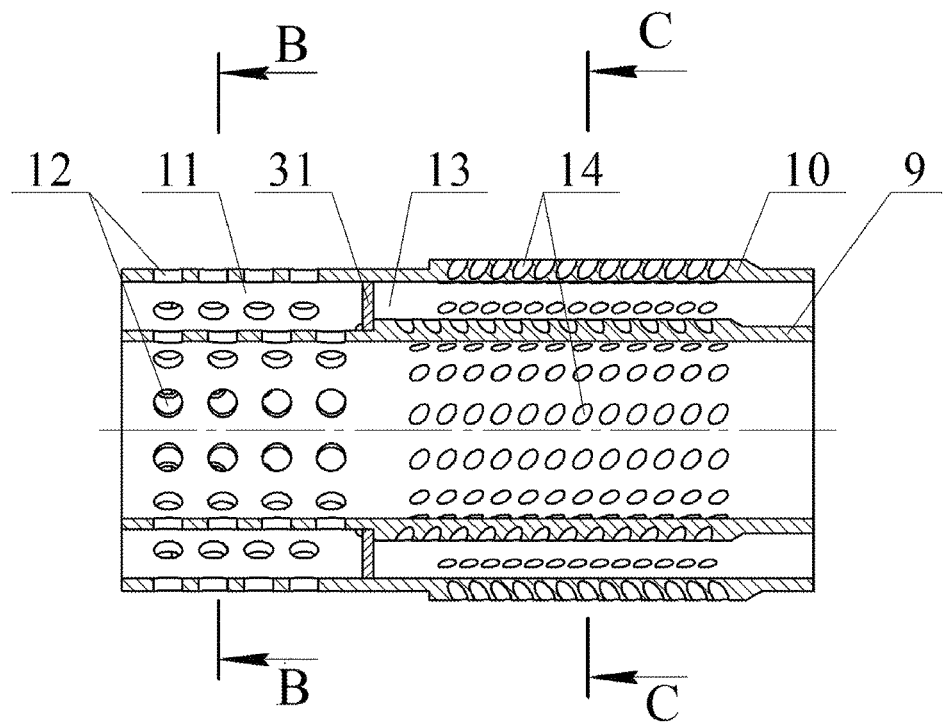
FIG. 4 shows longitudinal section of a separator with a separating shell.
Figure 5:
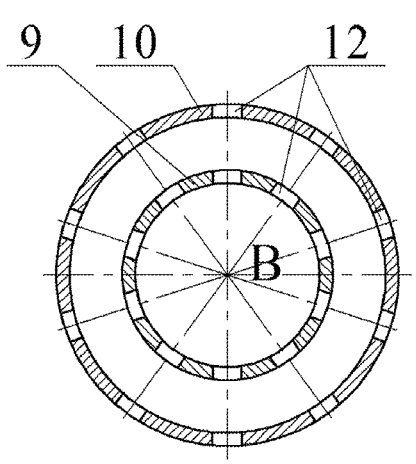
FIG. 5 shows view B-B of the FIG. 4.
Figure 6:
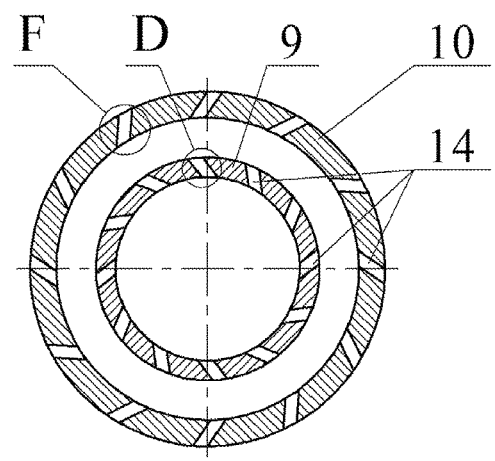
FIG. 6 shows view C-C of the FIG. 4.
Figures 7, 8:
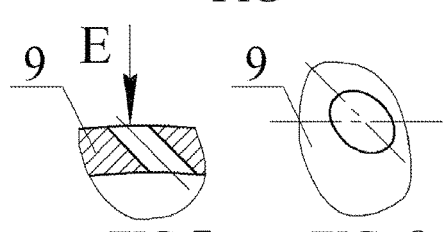
FIG. 7 shows view D of the FIG. 6.
FIG. 8 shows view E of the FIG. 7.
Figures 9, 10:
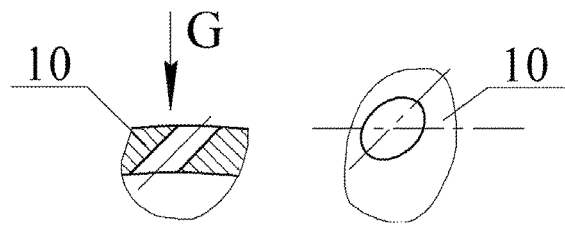
FIG. 9 shows view F of the FIG. 6.
FIG. 10 shows view G of the FIG. 9.
Figure 11:
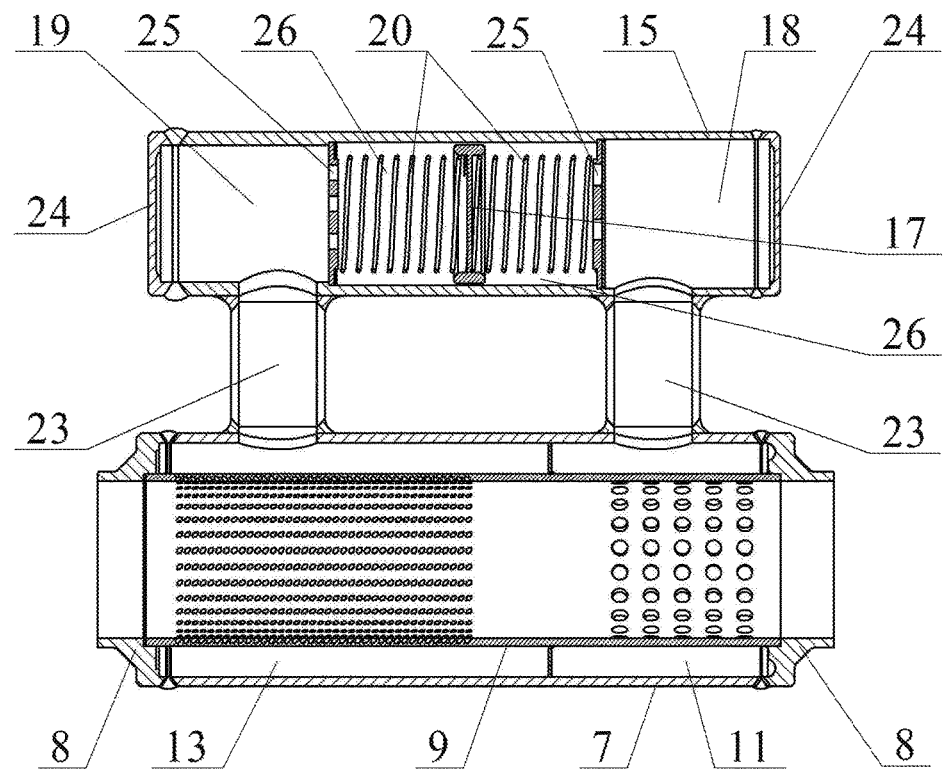
FIG. 11 shows stabilizer with separated compensation chambers.
Figure 12:
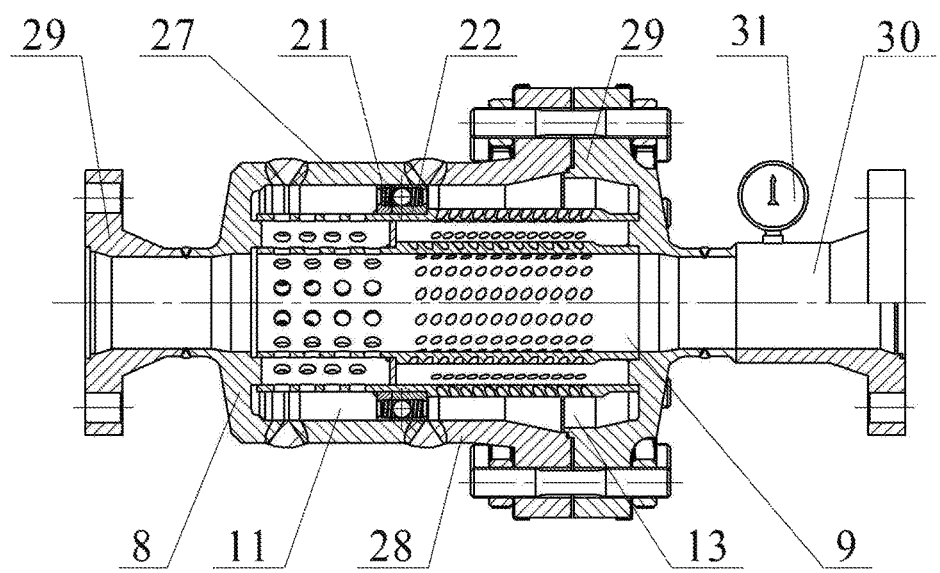
FIG. 12 shows collapsible stabilizer.

A method of self-extinguishing of shock pulses of transferred medium in main pipelines, consists in the fact that at the section of said pipeline 1 installed at least one pressure pulse stabilizer 4 in the direction of movement of transferred medium from supplier 2 to consumer 3.

Then pulse flow is directed as a first portion into the stabilizer 4, and after its first portion a second portion of the flow is directed, which after a delay is sent into additional input of the stabilizer 4.

First, the potential sources 5 of pressure pulses are revealed on the protected section of the pipeline 1. Then the place of installation of the stabilizer 4 is defined based on condition—at a distance no further than 10 meters of the potential point source of pressure pulses and on condition—at a distance 100-1000 meters during preventive installation on the road, at least two stabilizers on the stage (FIG. 14e).

Stabilizers 4 are oriented on the pointer 6 on its outer surface toward the potential point source 5 of the pressure pulses and the arrows pointed in the same direction as the direction of flow of the transferred medium at the stages (FIG. 14e).

Energy of the perturbing pressure pulse in the main pipelines 1 is killed by the phase shift and suppression of wave and vibrational oscillations and resonance processes in transferred medium by designing a stabilizer 4 of a hollow cylindrical casing 7 with covers 8 at its ends and concentrically secured detachable separator 9 and separation shell 10 to make the inner chamber therebetween, separated by separating web 31 into two unequal parts: straight flow chamber 11 smaller in size—at inlet of the stabilizer 4, into which through the radial holes 12 entering the first part of the flow of the transferred medium and a vortex chamber 13 larger in size in which the specified delay performed by diverting of the second part of the flow through the said additional inlet in the form of inclined holes 14, and—to form a compensation chamber 15 between the shell 10 and casing 7, separated by a damping block 16 with a spring-loaded piston 17 into a pressure chamber 18 connected with the radial holes 12 with the straight flow chamber 11 and the equalizing chamber 19 connected by the inclined holes 14 with the vortex chamber 13.

Wherein volume of the straight flow chamber 11 is set not less than ⅓ of the total volume of the vortex chamber 13; the diameter of the radial holes 12 is 1.2-4 of the diameter of the inclined holes 14 at equal total expenditures of the working medium through the radial 12 and inclined holes 14.

Angles of all inclined holes are set as: $\alpha$ relative to the radial axis of the cross section and $\beta$—relative to the longitudinal axis in the range of 0-45°.

Then pressure is equalized in the pressure chamber 18 and leveling chamber 19 equal to the pressure in the pipeline 1 by shifting the pistons 17 of the damping block 16 by the springs 20 to the original position and then performed free flow of the transferred medium through the stabilizer 4.

Said killing of pressure pulse is accomplished through the damping block 16, which is in the form of a ring holder with axial holes with said spring-loaded on both sides pistons 17.

Wherein a ring holder is divided by the plane of its transverse axis into two parts of unequal thickness, the smaller 21 of which is directed to the straight flow chamber 11 and is permanently secured to the separator 9, and the largest 22 is connected with the protrusion on the last.

Said killing of pressure pulse can carry through a series of separated from casing cylindrical compensation chamber 15 with axes parallel to the axis of the separator 9 connected thereto via extension pipes 23 and with end plugs 24.

Compensation chamber 15 is divided by perforated partitions 25 into three sizes; in the central chamber 26 said piston 17 is situated between the springs 20, where the side volumes are the pressure chamber 18 and equalizing chamber 19.

Said killing of pressure pulse may be done through stabilizer 4, which having collapsible casing 7 of the spacer 27, which is permanently connected with the outlet, the inlet 8 and the inner flange 28, the latter is connected to the intermediate flange 29 with the measuring device 30.

Comparison of the technical solution to the prior art known from the scientific, technical and patent documents at the priority date in the major and related headings found no means that have inherent features identical to all the features contained in the proposed by the applicant claims, including the description of the purpose. That is, the set of essential features of the claimed invention was not previously known, and is not identical to any known technical solutions; therefore, it corresponds to the condition of patentability "novelty."

INDUSTRIAL APPLICABILITY

This technical solution is industrially applicable, as in the description of the application and the name of the invention purpose; it can be produced by industrial method and used for overload protection of pipelines for various purposes.

The technical solution is functional, feasible and reproducible, and features of the device allow to obtain the specified technical result, i.e., are essential.

The technical solution in the form as it is characterized in the claims, can be accomplished by means and methods described in the prior art, which became available to the public before the priority date of the invention.

Therefore, the claimed technical solution meets the patentability of "industrial applicability".

Analysis of the known technical solutions in the field of the invention shown, that the proposed device may not be obvious to one skilled in the art, since no solutions have been identified, having features, coincide with the distinctive features of the invention and not confirmed the influence of distinctive features on said description in the application to the technical result.

I.e., the claimed invention has features which are absent in the prior art, and the use these features in the claimed conjunction of essential features makes it possible to obtain a new technical result—the simplification of manufacturing and assembly, increasing easiness of operation and effectiveness of killing of pulsation.

Consequently, the proposed technical solution can be obtained only through a creative approach and is not obvious to one of ordinary skill in the art, i.e. corresponds to the condition of patentability of the invention "inventive step" and, therefore, is new and involves an inventive step.

Collapsible self-liquidator of hydro-shock pulses of transferred medium in the main pipeline operates as follows.

This solution created by LLC "TehPromArma"—Russian company, that developed and implemented industrial manufacturing application of series of fundamentally new technical means of damping hydro-shocks and vibrations in any purpose pipelines.

The claimed device can be used for technological pipelines of nuclear power plants (NPP) in the normal operation systems and security systems with reactors types: VVER RBMK BN in pipeline systems having diameter from 10 to 1500 mm and an operating pressure of 0.01 to 250 bar (25 MPa).

The claimed device can be used to reduce the dynamic loads caused by the pressure fluctuations and hydraulic shocks effecting the pipelines and equipment, and as a result, reducing noise and vibration occurring when transferred medium flows.

Figure 14:
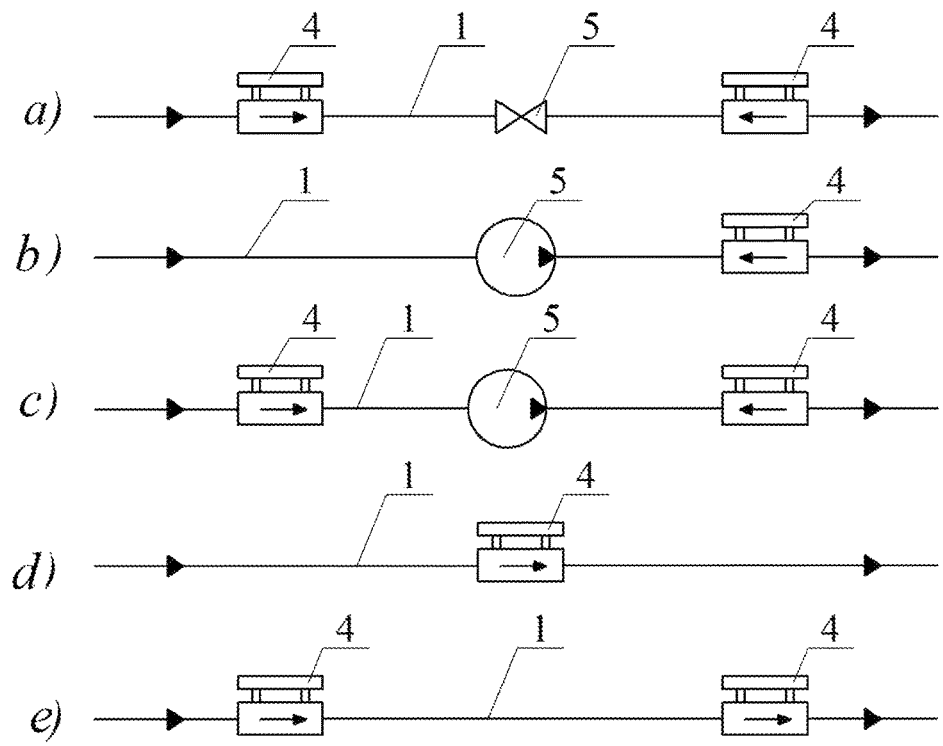
FIG. 14 shows schemes a-e of the installation of stabilizers.

Stabilizers 4 are installed in accordance with the composition of pipeline equipment 1 at the following schemes, FIG. 14:

a) stabilizers 4 are mounted in close proximity but not beyond 10 meters from stop fittings, pumps and other sources, creating a disturbance, including high-speed (cut-off), regulating, reverse, with any type of fitting control, so that arrow 6 on the casing 7 pointing in the direction of the fitting;

b) stabilizers 4 are installed after the pump so that the arrow 6 on the casing 7 of the stabilizer 4 pointed towards the pump;

c) in systems where pumps function as the devices which increase pressure in the pipeline 1, stabilizers 4 are installed before and after the pumps (arrow 6 on the casing 7 of the stabilizer 4 indicate toward the pump);

d) stabilizers 4 installed in areas of possible occurrence of two-phase modes (steam-water mixture);

e) stabilizers 4 are installed on straights sections of the pipeline 1 one after another, at a distance of 300 to 1000 meters.

Collapsible self-liquidator of hydro-shock pulses of transferred medium in the main pipeline operates on the principle of self-stabilization, where damping is performed by quenching of perturbing pulse energy by the energy of these same impulses.

Operation of the device is based on a distributed along the length of the pipeline dissipative and elastic-damping effects on the flow of the pumped medium.

In steady-state operating regime of medium flow (e.g., liquid) through a pipeline pressure on the inlet and outlet of the device is the same, thus constant pressure is established in all chambers 11, 13, 18, 19.

Pistons 17 of damping black 16 under the action of the springs 20 take a neutral position.

When the pressure pulse at the input of the pipeline, it is through the radial holes 12 direct flow chamber 11 reaches the equalizing chamber 19 almost instantaneously and with little loss of energy.

Another part of the pulse passes through the inclined holes 14 in the vortex chamber 13, thus there is a twisting of the flow of the transferred medium, reducing its amplitude by expanding and increasing its turbulence.

Because the holes 14 in the separator 9 and in separating shell 10 have opposite inclination, flow unwinds, which further dissipates the energy of the operating environment and as a consequence, reduces the amplitude of the pressure pulse and increases the time of its receipt.

Due to the pressure difference and the phase shift in the pressure chamber 18 and the equalizing chamber 19, pulse amplitude deducted, smoothed the transition process during fall of the pulse and the device is reset.

This sequential interaction of the fluid with the spring damping elements allows effective damping of oscillation overpressure (hydro shocks) at the expense of ductility of damping elements in the dynamic mode and the vibration energy dissipation on the holes of distributed perforation, leading to its loss, creating the conditions for preventing the further spread of the wave compensating pressure lapses.

Application of the device provides:

phase shift and damping of the wave and vibration processes to an acceptable level, as in an emergency, and in normal operation;

increasing corrosion-fatigue durability of pipes which prolongs lifespan for even worn pipelines 1.5-2 times;

reduction in total accidents of pipelines and equipment by 70-80%;

exclusion of financial losses associated with the liquidation of the consequences of accidents for reasons like hydro shocks, vibration and pressure pulsations;

reduced operating costs and implementation of the replacement of worn pipelines and equipment in hydro systems in the preventative mode, which is much cheaper than an emergency replacement of damaged sections of pipe.

Figure 13:
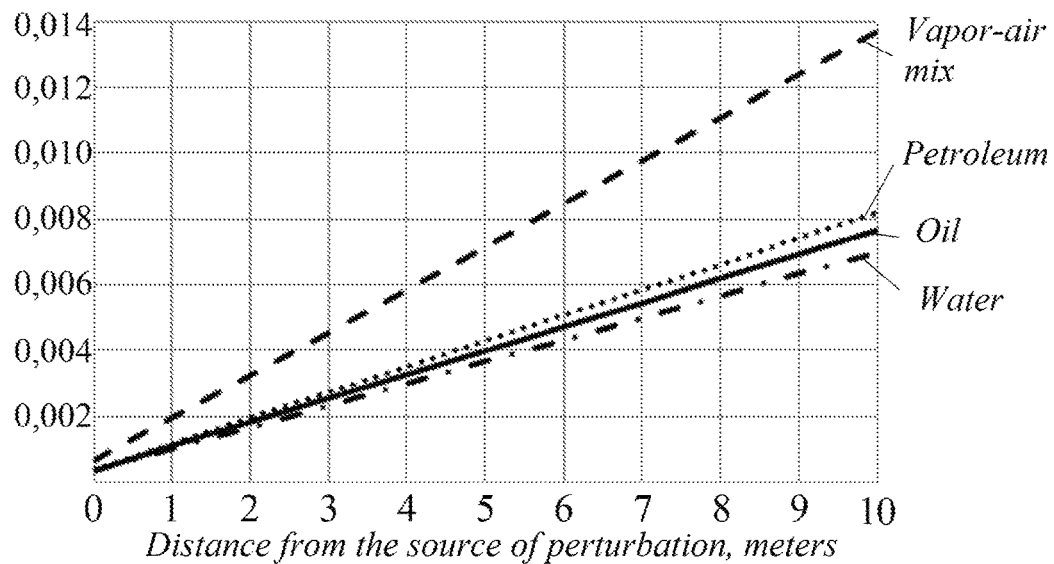
FIG. 13 shows graph of the response time of the stabilizer during transfer of various products.

Pressure stabilizers are equally effective as in an emergency, and in the normal operation of the hydro system for a variety of transferred products (FIG. 13).

Compared with the technical devices of similar purpose this invention has the following advantages:

time of reducing the amplitudes of Hydraulic shocks and pressure pulses in pipelines to the safe level is less than 0.004 sec;

reduction ratio to a safe level of not less than 10 times;

pipeline connection—welded or with flanges;

lack of regulatory control mechanisms, no loss of operating environment.

Using this invention can simplify manufacturing and assembly technology, and improve the efficiency of damping of pressure pulsations.

The invention claimed is:

1. A method of extinguishing of pressure pulses of transferred medium in pipelines, comprising at least one pressure pulse stabilizer installed on said pipeline in a direction of movement of transferred medium fluid flow from a supplier to a consumer, wherein pulse flow is directed as a first portion into the pressure pulse stabilizer, and after a delay a second portion of the pulsed flow is directed into an additional input of the pressure pulse stabilizer, wherein said placement of the pressure pulse stabilizer is selected based upon preliminary identified potential pressure pulse sources: wherein each pressure stabilizer is installed within 10 meters of pressure pulses source and spaced within at least 100-1000 meters of an adjacent pressure pulse stabilizer on the pipeline wherein the stabilizers are oriented such that an indicator on an outer surface of the pressure pulse stabilizers points toward pressure pulse source, thus the energy of the perturbing pressure pulses in the main pipelines is extinguished by a phase shift and suppression of wave and vibratory oscillations and resonance processes in transferred medium; wherein the at least one pressure pulse stabilizer comprises: a hollow cylindrical casing having a first end and a second end: covers coupled to the first and second ends; and detachable separator and a separation shell which are concentrically secured so as to form an inner cavity therebetween; wherein the inner cavity is partitioned by a separating web so as to form a first inner cavity part and a second inner cavity part which is of a different size that the first inner cavity part, the first inner cavity part is located at an inlet of the pressure pulse stabilizer and configured as a straight flow chamber which is smaller in size than the second inner cavity part; wherein fluid flow from the-inlet of the pressure pulse stabilizer flow through a plurality of radial holes located in the detachable separator and separation shell; the second inner cavity part is configured as a vortex chamber wherein the delay performed by diverting the second portion of the pulsed flow through a plurality of inclined holes located in the detachable separator and separation shell: wherein an outer cavity is formed between the separation shell and casing, the outer cavity separated by a at least one damping unit, each damping unit comprising a spring-loaded piston located within a central chamber, the damping unit located between the plurality of radial holes and inclined holes located in the separation shell so as to separate the outer cavity into a pressure chamber and an equalizing chamber; wherein the volume of the straight flow chamber is at least ⅓ of the total volume of the vortex chamber; wherein the diameter of the radial holes is 1.2-4 times as large of the diameter of the inclined holes such that at-an equal amount of the working medium through the radial holes and inclined holes, wherein the plurality of all inclined holes are angled relative to a radial axis of a cross section of the stabilizer in the range of 0-45°, wherein pressure is equalized in the pressure chamber, the equalizing chamber and the pipeline by shifting the spring-loaded pistons of the at least one damping unit: upon equalization of chamber pressure by the spring loaded pistons return to a default position and free flow of the transferred medium through the stabilizer resumes.

2. Method of extinguishing of pressure pulses of transferred medium in pipelines according to claim 1, wherein said extinguishing of pressure pulses is achieved through the damping unit having a form of a ring holder with axial holes with spring-loaded pistons on each side wherein the ring holder is divided in the transverse direction with respect to its axis into two parts of unequal thickness, the smaller of which is directed to the straight flow chamber and is permanently secured to the separator, and the larger of which is connected with a protrusion on the separator.

3. Method of extinguishing of pressure pulses of transferred medium in pipelines according to claim 1, wherein said extinguishing of pressure pulses is achieved the casing cylindrical compensation chambers; wherein the compensation chambers have end plugs and are connected to the casing via extension pipes; wherein the compensation chambers' axes are parallel to the axes of separator, wherein compensation chambers is are divided into three parts by perforated partitions; wherein in the central-part the piston is situated between the springs: wherein two other parts are a pressure chamber and an equalizing chamber.

4. Method of extinauishing of pressure pulses of transferred medium in pipelines according to claim 1, wherein said extinguishing of pressure pulses is performed by the stabilizer, having a demountable casing; wherein the demountable casing is permanently connected to the output, the input and internal flanges: wherein the internal flange is connected to an intermediate flange with a measuring device.

* * * * *